(12) United States Patent
Boström et al.

(10) Patent No.: US 7,319,146 B2
(45) Date of Patent: Jan. 15, 2008

(54) NONIONIC CELLULOSE ETHER AND ITS USE

(75) Inventors: Peter Boström, Ytterby (SE); Kenneth Sundberg, Stenungsund (SE)

(73) Assignee: Akzo Nobel N.V., Arnhem (NL)

( * ) Notice: Subject to any disclaimer, the term of this patent is extended or adjusted under 35 U.S.C. 154(b) by 50 days.

(21) Appl. No.: 10/544,164

(22) PCT Filed: Jan. 16, 2004

(86) PCT No.: PCT/SE2004/000041

§ 371 (c)(1),
(2), (4) Date: Oct. 19, 2005

(87) PCT Pub. No.: WO2004/067573

PCT Pub. Date: Aug. 12, 2004

(65) Prior Publication Data

US 2006/0148937 A1    Jul. 6, 2006

(30) Foreign Application Priority Data

Jan. 31, 2003    (SE) .................................... 0300235

(51) Int. Cl.
*C08B 11/193*    (2006.01)
*C08B 11/20*    (2006.01)

(52) U.S. Cl. .......................... 536/91; 536/85; 536/87; 536/88

(58) Field of Classification Search ..................... None
See application file for complete search history.

(56) References Cited

U.S. PATENT DOCUMENTS

| 4,288,277 A | 9/1981 | Siilats ........................ 156/425 |
| 4,429,120 A | 1/1984 | Dehnke ........................ 536/91 |
| 5,013,832 A | 5/1991 | Raehse et al. ................. 536/90 |
| 5,140,099 A | 8/1992 | Bostrom et al. ............... 536/91 |
| 5,395,930 A * | 3/1995 | Bartz et al. .................... 536/92 |
| 6,123,996 A | 9/2000 | Larsson et al. ............. 427/361 |
| 6,248,880 B1 | 6/2001 | Karlson ........................ 536/91 |

FOREIGN PATENT DOCUMENTS

| EP | 0929716 | 7/1999 |
| EP | 0929716 B1 | 7/1999 |
| WO | WO 00/08058 | 2/2000 |
| WO | WO 03/048070 A1 | 6/2003 |
| WO | WO 03/048211 A1 | 6/2003 |

OTHER PUBLICATIONS

International Search Report, No.: PCT/SE2004/000041, May 05, 2004.
Hodges et al., "Determination of Alkoxyl Substitution in Cellulose Ethers by Zeisel-Gas Chromatography," Analytical Chemistry, vol. 51, No. 13, Nov. 1979, pp. 2172-2176.
Stead et al., "A Modified Method For The Analysis Of Oxyethylene/Oxyproylene Copolymers By Chemical Fission And Gas Chromatography," Journal of Chromatography, (1969), pp. 470-475.

* cited by examiner

*Primary Examiner*—Shaojia Anna Jiang
*Assistant Examiner*—Layla Bland
(74) *Attorney, Agent, or Firm*—Ralph J. Mancini

(57) ABSTRACT

The present invention relates to a nonionic methyl ethyl hydroxyethyl cellulose ether having a flocculation temperature of 70-95° C., a DS-methyl of 0.1-0.8 and a DS-ethyl of 0.1-0.7. The cellulose ether has versatile properties and may be used as a thickening agent or a rheology modifier in an aqueous formulation, such as an aqueous latex-containing paint composition. A process for manufacturing the cellulose ether is also disclosed.

12 Claims, No Drawings

NONIONIC CELLULOSE ETHER AND ITS USE

This case was filed under the Patent Cooperation Treaty on Jan. 16, 2004 and claims priority of Swedish patent application ser. No. 0300235-9 filed on Jan. 31, 2003.

The present invention relates to a nonionic methyl ethyl hydroxyethyl cellulose ether having a flocculation temperature from 70-95° C. The cellulose ether has versatile properties and may be used as a thickening agent or a rheology modifier in an aqueous formulation, such as an aqueous latex-containing paint composition.

Nonionic cellulose ethers have for a long period of time been used as a thickening agent in aqueous paint compositions, for instance in latex-containing paint compositions. They have also a considerable effect on the stability, consistency and water retention of aqueous paint compositions. Furthermore, the nonionic cellulose ethers are easy to combine with frequently occurring ingredients in the paint compositions.

One group of nonionic cellulose ethers often used in aqueous paint compositions is the hydroxyethyl cellulose ethers, lacking a flocculation temperature below 100° C. in water. Such cellulose ethers are appreciated since they normally, when used in aqueous paint compositions, contribute to a stable viscosity, a low tendency to flocculate organic and inorganic pigments and a low tendency to form stable foams. However, the hydroxyethyl cellulose ethers have the disadvantage of a comparatively weak thickening effect and no or only a weak wetting ability.

Another group of nonionic cellulose ethers is the water-soluble cellulose ethers that exhibit a flocculation temperature in water below 100° C. Examples of such cellulose ethers are methyl hydroxyethyl cellulose ethers, methyl hydroxypropyl cellulose ethers, methyl cellulose ethers and ethyl hydroxyethyl cellulose ethers having a flocculation temperature in water of about 50-75° C. These cellulose ethers are appreciated since they have a good thickening and wetting ability and reduce the surface tension. They also impart an improved flowability to the aqueous paint composition in comparison with hydroxyethyl cellulose ethers with a flocculation temperature above 100° C. However, the disadvantage of the alkyl cellulose ethers is that they sometimes contribute to the formation of stable foam and to the flocculation of inorganic or organic pigments, when producing the paint, as well as to increased viscosity in the paint composition during storage.

Water-soluble methyl ethyl hydroxyethyl cellulose ethers are also known and disclosed in EP 929 716 A1, PCT/SE02/02164 and PCT/SE02/02165. These cellulose ethers may advantageously be used in mortars or paper coating compositions.

Therefore, there is an obvious need to find new more versatile nonionic cellulose ethers with improved properties, which make the ethers suitable to use in aqueous paint compositions. Such nonionic cellulose ethers with improved properties could be cellulose ethers which reduce the surface tension (improved wetting ability) but do not contribute to foam of high stability; or cellulose ethers, which render high stability to aqueous paint compositions without causing flocculation of inorganic and organic pigments resulting in a good colour acceptance.

It has now been found that a certain type of water-soluble methyl ethyl hydroxyethyl cellulose ethers reduces the formation of stable foam and improves the stability when used in aqueous paint compositions but has not a disturbing tendency to flocculate organic and inorganic pigment or to increase the viscosity during storage. Still the cellulose ethers maintain the favourable properties of the alkyl cellulose ethers, such as a good wetting ability and a high thickening effect. The cellulose ethers according to the invention has a flocculation temperature of 70-95° C., suitably 75-90° C. and preferably from 78-85° C., a DS substitution of methyl from 0.1-0.8, preferably from 0.2-0.6, and a DS substitution of ethyl from 0.1-0.7, preferably from 0.2-0.6. The MS-hydroxyethyl is suitably from 1.5-2.8, preferably from 1.7-2.5. The viscosity of the alkyl hydroxyethyl cellulose ethers according to the invention is normally between 10-10000 cP, preferably 100-7000 cP, measured in a 1% water solution of pH 7 according to Brookfield LV at 12 rpm at 20° C.

For the determination of the methyl, ethyl and hydroxyethyl substituents, two methods have been combined. Both methods use the same principle, namely the cleavage of ether bonds by a halogen acid and quantitative gas chromatography of the alkyl halides formed. The methyl substitution is determined by using hydroiodic acid and adipic acid resulting in the cleavage of the ether bonds and formation of the corresponding alkyl iodide. During the reaction the alkyl iodides formed are continuously extracted into a xylene phase, which is analyzed by gas chromatography. In the cleavage reaction both ethyl and hydroxyethyl substituents form ethyl iodide, which makes it necessary to further analyze the ethyl and hydroxyethyl substituents. Therefore, the ethoxy and hydroxyethoxy groups also are cleaved by hydrobromic acid in acetic acid, the ethyl and hydroxyethyl groups forming ethyl bromide and 1,2-dibromoethane. The amounts of these bromides are determined by gas chromatography. See also Hodges, K. L.; Analytical Chemistry; Vol 51 (1979), p 2172 and Stead Hindley; J Chromatog (1969); p 470-475.

Besides methyl, ethyl and hydroxyethyl substituents the alkyl hydroxyethyl cellulose ether can also contain other substituents, such as hydroxypropyl and substituents hydrophobically modified by the presence of a hydrocarbon group of 4-22 carbon atoms. Suitable substituents containing hydrocarbon groups with 4-22 carbon atoms are disclosed in U.S. Pat. Nos. 4,228,277 and 5,140,099 and in the patent publication WO 00/08058. Especially suitable are substituents containing a group of the formula

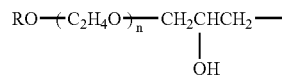

wherein R is an aliphatic group of 8-16 carbon atoms and n is a number from 1 to 7. If present, the $MS_{hydroxypropyl}$ is normally from 0.1-0.5 and the MS for the substituents containing the $C_4$-$C_{22}$-hydrocarbon group is suitably from 0.006 to 0.1.

The methyl ethyl hydroxyethyl cellulose ethers according to the invention can be prepared by reaction steps known per se according to well established practice in the field. Thus, alkali cellulose (activated cellulose) may be prepared in one or several steps by mercerizing cellulose with alkali and further reacted in one or several steps with appropriate amounts of ethylene oxide, methyl chloride and ethyl chloride in the presence of an organic reaction medium, for instance ethyl chloride, acetone, alkyl-blocked mono or poly(ethylene glycols), isopropanol, tert. butanol or dimethoxyethane or mixtures thereof at a temperature from 50-120° C. Suitably the cellulose is mercerized in one or several steps with aqueous alkali in a total amount of 0.8-1.8 moles of alkali per mole saccharide unit; and ethylene oxide in a total amount of 2.6-5.5 moles per mole saccharide unit, methyl chloride in a total amount of 0.2-1.5 moles per mole saccharide unit and ethyl chloride in a total amount of 0.2-1.5 moles per mole saccharide unit are added to and reacted with the mercerized cellulose in one or several steps in the presence of an organic reaction medium at a temperature from 50-120° C. The weight ratio between the reaction medium and the cellulose can be 1:1 to 10:1, suitably from 4:3 to 3:1. In case ethyl chloride is used as a reaction medium, the desired amount of ethyl chloride is already present in the reaction mixture and there is no need for further addition of ethyl chloride. The ethylation can be regulated by the amount of alkali used, the reaction temperature and reaction time. If desired, a part of the alkali may be added at a later stage during the reaction in order to further activate the cellulose. The total degree of substitution of methyl and ethyl can be controlled by the amount of alkali used in the mercerization process, since a corresponding equivalent amount of NaOH is consumed and form sodium chloride. Due to side reactions the yield of alkyl substitutions is only 40-60%.

According to one suitable embodiment of the invention, the mercerization of the cellulose with alkali can take place both in an initial stage of the process and in a later stage in the process, preferably after addition and reaction of a portion of the total amount of ethylene oxide and at least a portion of the total amount of methyl chloride and at least a portion of the total amount of ethyl chloride with the initially mercerized cellulose. In such a process the cellulose may initially be mercerized with a portion of the total amount of alkali; a portion of the total amount of ethylene oxide, a portion of or the total amount of methyl chloride and a portion of or the total amount of ethyl chloride, if ethyl chloride is not present as a reaction medium, are added to and reacted with the initially mercerized cellulose in one or several steps at a temperature from 50-120° C., whereupon the partially substituted mercerized cellulose is further mercerized with the remaining portion of the alkali; and the remaining portion of the ethylene oxide and any remaining portion of methyl chloride and partially any remaining portion of ethyl chloride, if ethyl chloride is not present as a reaction medium, are added to and reacted with the further mercerized cellulose in one or several steps at a temperature from 50-120° C. Normally, the ethoxylation reaction takes place at 50-80° C., the methylation reaction at 65-90° C. and the ethylation reaction at 95-115° C.

The versatile cellulose ethers of the invention may advantageously be used in aqueous formulations in amounts of 0.1-2.5% by weight as thickeners or rheology modifiers. The formulations may have the form of solutions, emulsions, dispersions or suspensions. Typical application areas are aqueous paint compositions, such as latex paints; aqueous organic filler compositions; aqueous personal care products, such as shampoos, aqueous conditioners and cosmetics; aqueous detergent compositions, such as hard surface cleaners and compositions for laundry; and aqueous paper coating compositions, such as a coating slip.

The cellulose ethers are well suited for use in waterborne flat, semi-flat, semi-gloss and gloss paint compositions. The amounts added of the cellulose ethers vary depending on both the ingredients of the paint compositions and the substitution and viscosity of the cellulose ethers, but normally the addition is 0.2-1.5% by weight of the paint compositions. Suitable binders are emulsion binders, such as alkyd resins, and latex binders, such as polyvinyl acetate, copolymers of vinyl acetate and acrylate, copolymers of vinyl acetate and ethylene, copolymers of vinyl acetate, ethylene and vinyl chloride and copolymers of styrene and acrylate. The latex binders are often stabilized with anionic surfactants.

The present invention is further illustrated by the following Examples.

EXAMPLE 1

A reactor having a volume of 130 litres was charged with 8 kg of milled cotton linter, whereupon the gas phase of the reactor was evacuated to 5 kPa and filled with nitrogen to atmospheric pressure. The evacuation and refill with nitrogen gas were repeated once and finally the reactor was evacuated to 5 kPa. Thereafter 4.74 kg of an aqueous alkali solution, containing 50% by weight of NaOH (1.2 mole of NaOH), was sprayed on the milled cotton linter during stirring followed by the addition of 13.6 kg ethyl chloride. The mixture in reactor was stirred at 30° C. for 15 minutes to mercerize the milled cotton linter into alkali cellulose. Thereafter, 2.17 kg of ethylene oxide (1.0 mole) and 1.50 kg of methyl chloride (0.6 mole) were added. The reaction mixture was continuously heated to 70° C. during 20 minutes. After 20 minutes at 70° C. the major parts of the ethylene oxide and methyl chloride had reacted with the alkali cellulose and an additional amount of 5.43 kg of ethylene oxide (2.5 mole) was gradually added during 45 minutes. After 10 minutes the temperature was further increased to 105° C. and a final reaction between ethyl chloride and remaining alkali activated positions in the cellulose took place.

After the reaction the volatile compounds including the ethyl chloride used as a reaction medium where driven off and the rest of the reaction mixture was washed with water containing 5% by weight of $Na_2SO_4$ of a temperature of about 95° C. to remove by-products, such as NaCl and glycols formed during the reaction. The solid phase was separated by centrifugation and dried to a moisture content of less than 3% by weight.

Finally the cellulose ether was milled to a particle size less than 1 mm. The cellulose ether was analyzed with regard to the degree of substitution (DS) of methyl and ethyl and to the molecular substitution (MS) of hydroxyethyl by gas chromatography after cleavage by hydrobromic acid and hydroiodic acid. The flocculation temperature was determined by use of a spectrophotometer under a continuous temperature increase. The viscosity was measured by a Brookfield viscometer, type LV, at a temperature of 20° C. in a 1% buffered solution at pH 7.0, while the clarity was measured by light transmission in comparison with water at 20° C.

Biostability (enzymatic resistance) was determined as the remaining viscosity after 60 minutes degradation with cellulase at 20° C.

Substitution values and other analyzed properties are shown in Table 1 below.

EXAMPLE 2

In this example the process described in Example 1 was followed but with the exception that the addition of NaOH was increased to 5.53 kg of an aqueous solution containing 50% by weight of NaOH (1.40 mole). The results obtained are shown in Table 1.

EXAMPLE 3

In this example the process described in Example 1 was followed but with the exception that the addition of the aqueous solution containing 50% by weight of NaOH was increased to 6.32 kg (1.60 mole NaOH).

EXAMPLE 4

In this Example the procedure of Example 2 was followed but in the initial part the amounts of the NaOH aqueous solution and ethylene oxide were reduced to 5.14 kg (1.3 moles) and 3.26 kg (1.5 moles) respectively and the amount of ethyl chloride was increased to 16 kg. After the reaction with ethyl chloride the temperature was lowered from 105° C. to 70° C. and 0.79 kg of a water solution containing 50% by weight of NaOH (0.2 moles) was sprayed on the reaction mixture during stirring and the partially substituted cellulose ether was further mercerized. After the mercerization an additional amount of 3.26 kg (1.5 moles) of ethylene oxide was introduced and reacted with the further mercerized cellulose during 20 minutes. Then the temperature was increased from 70° C. to 100° C. and maintained for about 30 minutes, when almost all alkali had reacted.

EXAMPLE 5

This Example followed the procedure in Example 4, but the methyl chloride was gradually added in an amount of 1.75 kg (0.7 moles) after the first reaction with ethylene oxide.

EXAMPLE 6

This Example followed the procedure in Example 5, but the initial amount of NaOH was increased to 5.53 kg (1.4 moles), the addition of methyl chloride to 2.24 kg (0.9 moles) and the second addition of ethylene oxide was increased to 3.69 kg (1.7 moles).

TABLE 1

Degrees of substitution and properties of the cellulose ethers produced in Examples 1-6

| Example | MS EO | DS Me | DS Et | Visc mPa·s | Clarity % | Flocculation Temp. °C | Bio stab % |
|---|---|---|---|---|---|---|---|
| 1 | 1.9 | 0.3 | 0.3 | 2870 | 70.5 | 91.7 | 48 |
| 2 | 1.9 | 0.3 | 0.4 | 5280 | 94.0 | 84.3 | 52 |
| 3 | 1.9 | 0.3 | 0.5 | 7460 | 95.2 | 77.7 | 55 |
| 4 | 2.2 | 0.35 | 0.45 | 6480 | 90.8 | 76.8 | 91 |
| 5 | 2.2 | 0.4 | 0.4 | 6230 | 95.6 | 81.2 | 90 |
| 6 | 2.3 | 0.5 | 0.35 | 6030 | 90.0 | 79.4 | 98 |

EXAMPLE 7

The properties of the cellulose ethers of Examples 1-6 and of some comparison cellulose ethers designated A-D were tested in a decorative paint composition with the following recipe.

| Ingredients | Parts by weight |
|---|---|
| Water | 213 |
| Thickener | 4 |
| Defoamer (Byk 022) | 2 |
| Antibacterizid (Canguard) | 1 |
| Dispersing agent (Dispex N 40) | 4 |
| Calcium carbonate | 110 |
| Titanium dioxide | 180 |
| Film forming agent (Texanol) | 10 |
| Styrene-acrylate latex (Acronal S 559) | 473 |

The Stormer viscosity, KU, and colour acceptance were immediately determined, while the stability was determined after storage at 50° C. for one week. A high Stormer viscosity indicates that the thickener is effective. The stability of the composition was determined after storage at 50° C. for one week. The increase in the Stormer viscosity was judged according to a scale, where the value 1 stands for an increase of more than 20 KU, 2 for less than 20 KU, 3 for less than 10 KU, 4 for less than 5 KU and 5 for less than 2 KU. The colour acceptance was determined according to the rub-out test after a scale running from 1-7, where 7 indicates no visible difference (Unisperse-Schwartz CE-2).

TABLE 2

Properties of cellulose ethers and comparison in decorative paint

| Thickener | Flocculation temp, °C. | Surface tension mN/m | Stormer visc, KU | Stability | Colour acceptance |
|---|---|---|---|---|---|
| MEHEC[1], A | 67 | 53 | 104 | 3 | 1 |
| EHEC[1], B | 70 | 52 | 100 | 3 | 2 |
| MHEC[1], C | 70 | 57 | 106 | 3 | 1 |
| MHEC, D | 77 | 55 | 106 | 3 | 2 |
| Ex 1 | 91.7 | 57 | 100 | 5 | 6 |
| Ex 2 | 84.3 | 56 | 104 | 5 | 5 |
| Ex 3 | 77.7 | 56 | 106 | 4 | 5 |
| Ex 4 | 76.8 | 56 | 106 | 4 | 3 |
| Ex 5 | 81.2 | 56 | 104 | 5 | 5 |
| Ex 6 | 79.4 | 55 | 105 | 5 | 4 |

[1]MEHEC = methyl ethyl hydroxyethyl cellulose; EHEC = ethyl hydroxyethyl cellulose; MHEC = methyl hydroxyethyl cellulose From the results it is evident that the cellulose ethers according to Examples 1-6 have considerably improved stability and colour acceptance than the comparison cellulose ethers, while the Stormer viscosities are similar.

EXAMPLE 8

The cellulose ethers in Example 7 were also tested regarding their foaming ability in an aqueous water solution containing 0.1% by weight of the cellulose ethers at 20° C. The foaming tests were performed in a 500 ml cylinder rotating with a speed of 40 rpm/minute round a horizontal shaft perpendicular to the cylinder axis. The cylinder had a scale from 0-500 mm and the samples were added in an amount of 100 ml. The foam heights were measured immediately and after 60 minutes.

TABLE 3

Foaming ability in water solution

| Cellulose ether | Foam height, mm | |
|---|---|---|
| | Immediately | 60 minutes |
| MEHEC, A | 78 | 65 |
| EHEC, B | 87 | 60 |
| MHEC, C | 80 | 30 |
| MHEC, D | 80 | 58 |
| Ex 1 | 70 | 0 |
| Ex 2 | 75 | 0 |
| Ex 3 | 72 | 0 |
| Ex 4 | 77 | 20 |
| Ex 5 | 75 | 0 |
| Ex 6 | 75 | 0 |

The cellulose ethers according to Examples 1-6 have lower foaming than the cellulose ethers in the comparison test.

EXAMPLE 9

Decorative paint compositions containing different cellulose ethers according to the table below were prepared, but the styrene-acrylate dispersion binder of Example 7 was replaced by another styrene-acrylate dispersion binder, Joncryl 537. The colour acceptance and Stormer viscosity of the different compositions were measured.

TABLE 4

Comparison in decorative paint

| Cellulose ethers | Stormer viscosity KU | Colour acceptance 1-7 |
|---|---|---|
| EHEC, B | 90 | 1 |
| MHEC, C | 76 | 4 |
| MHEC, D | 86 | 2 |
| Ex 1 | 91 | 7 |
| Ex 2 | 88 | 6 |
| Ex 3 | 89 | 5 |
| Ex 4 | 88 | 5 |
| Ex 5 | 92 | 6 |
| Ex 6 | 91 | 6 |

The results obtained confirm the corresponding results in Example 7.

The invention claimed is:

1. A methyl ethyl hydroxyethyl cellulose ether, wherein the cellulose ether has a flocculation temperature of 70-95° C., a DS-methyl of 0.1-0.8 and a DS-ethyl of 0.1-0.7.

2. The cellulose ether of claim 1, having a MS-hydroxyethyl of 1.5-2.8.

3. The cellulose ether of claim 1, having a DS-methyl of 0.2-0.6, a DS-ethyl of 0.2-0.6 and a MS-hydroxyethyl of 1.7-2.5.

4. The cellulose ether of claim 3, having a flocculation temperature of 78-85° C.

5. The cellulose ether of claim 1 further comprising substituents selected from hydroxypropyl, substituents containing hydrocarbon groups of 4-22 carbon atoms, or mixtures thereof.

6. A process for manufacturing the methyl ethyl hydroxyethyl cellulose ether according to claim 1 which comprises mercerizing cellulose in one or several steps with aqueous alkali in a total amount of 0.8-1.8 moles of alkali per mole saccharide unit; and ethylene oxide in a total amount of 2.6-5.5 moles per mole saccharide unit, methyl chloride in a total amount of 0.2-1.5 moles per mole saccharide unit and ethyl chloride in a total amount of 0.2-1.5 moles per mole saccharide unit are added to and reacted with the mercerized cellulose in one or several steps in the presence of an organic reaction medium at a temperature from 50-120° C.

7. The process of claim 6, wherein the reaction medium is ethyl chloride.

8. The process of claim 6 wherein the cellulose is initially mercerized with a portion of the total amount of alkali; a portion of the total amount of ethylene oxide, a portion of or the total amount of methyl chloride and a portion of or the total amount of ethyl chloride, if ethyl chloride is not present as a reaction medium, are added to and reacted with the initially mercerized cellulose in one or several steps at a temperature from 50-120° C., whereupon the partially substituted mercerized cellulose is further mercerized with the remaining portion of the alkali; and the remaining portion of the ethylene oxide and any remaining portion of methyl chloride and any remaining portion of ethyl chloride, if ethyl chloride is not present as a reaction medium, are added to and reacted with the further mercerized cellulose in one or several steps at a temperature from 50-120° C.

9. An aqueous formulation containing 0.1-2.5% by weight of the cellulose ether of claim 1.

10. The aqueous formulation of claim 9, wherein the formulation is a waterborne paint composition containing a latex binder.

11. A rheology modifier for aqueous compositions which comprises at least one methyl ethyl hydroxyethyl cellulose of claim 1.

12. The modifier of claim 11 wherein said aqueous composition is a waterborne latex paint composition.

* * * * *